April 30, 1929.  D. S. B. SHANNON  1,711,399
RECEIVING APPARATUS FOR WIRELESS TELEGRAPHY AND TELEPHONY
Filed Jan. 2, 1924  2 Sheets-Sheet 1

Inventor
Derek S. B. Shannon
By *(signature)*
Attorney

April 30, 1929.   D. S. B. SHANNON   1,711,399
RECEIVING APPARATUS FOR WIRELESS TELEGRAPHY AND TELEPHONY
Filed Jan. 2, 1924   2 Sheets-Sheet 2

Inventor
Derek S. B. Shannon
By
Attorney

Patented Apr. 30, 1929.

1,711,399

UNITED STATES PATENT OFFICE.

DEREK SEATON BUTLER SHANNON, OF SUTTON COLDFIELD, ENGLAND.

RECEIVING APPARATUS FOR WIRELESS TELEGRAPHY AND TELEPHONY.

Application filed January 2, 1924, Serial No. 684,012, and in Great Britain January 11, 1923.

This invention relates to receiving apparatus for use in connection with wireless telegraphy and telephony, of the type wherein a three-electrode vacuum tube or thermionic valve is employed as a detector or rectifier, in combination with a grid condenser in the grid circuit and a grid leak or resistance connected across the grid condenser or directly across the grid and filament.

The principal object of the present invention is to increase the sensitivity or efficiency of the detector or rectifier and to obtain greater amplification for a given number of valves, so as thereby to enable a definite aerial to be dispensed with if desired, without substantially affecting the loudness or clearness of the signals received.

According to the said invention, the grid is connected, through the grid leak or resistance, to the positive terminal of the filament or other battery (instead of to the negative terminal as usual) whereby a positive potential is normally applied to the said grid, in combination with a grid condenser of large capacity compared with that usually employed (for example, between .0005 and .02 microfarads) and a grid leak or resistance of a relatively low value (for example, 100,000 ohms or less).

Fig. 1 of the accompanying drawings is a diagram showing the application of the invention to a circuit employing reaction amplification.

Figure 1:
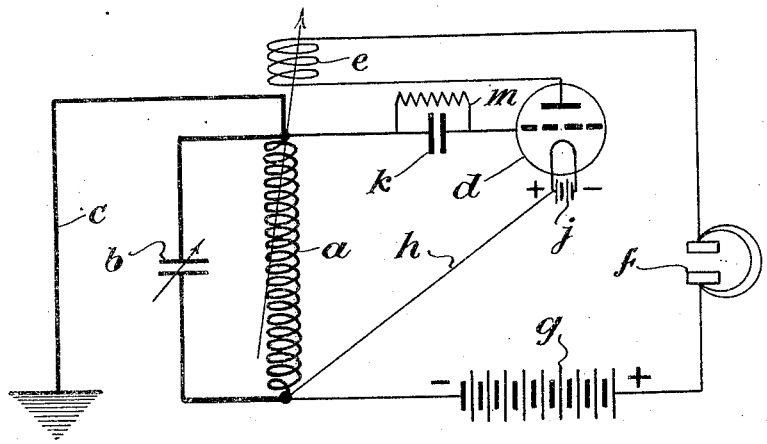

Referring to Figure 1, the receiving circuit comprises the usual tuning inductance $a$ shunted by the variable condenser $b$, or otherwise tuned, the upper end of the said inductance preferably being earthed by means of the connection $c$, although such earth connection is not absolutely necessary. Or the earth connection may be from the lower end of the inductance or the position of this earth connection may be variable between opposite ends of the inductance. A three-electrode valve $d$ is employed, the anode circuit including a reaction coil $e$ coupled to the inductance $a$, and the telephones $f$ being connected between the said reaction coil and the positive terminal of the high-tension battery $g$ the negative terminal of which is connected to the lower end of the inductance $a$.

According to the present invention a connection $h$ is taken from the lower end of the inductance $a$ to the positive terminal of the filament battery $j$, instead of to the negative terminal, as usual; and the grid is connected to the upper end of the said inductance through the medium of a condenser $k$ of a large capacity, for example, .01 microfarads. The value of this capacity may vary, however, between .0005 microfarads and .02 microfarads, the lower value being permissible when the grid is earthed as in Figure 1. This grid condenser $k$ has connected in shunt across its terminals a grid leak consisting of a comparatively low resistance $m$, which may be, for example, of 100,000 ohms. This resistance, however may be of less value than 100,000 ohms.

With the above arrangement the grid is normally maintained at a positive potential, and it is found that a small variation in the grid potential due to incoming signals will result in a comparatively large variation in the current in the anode circuit, such variation being transmitted to the telephones or to an audio-frequency amplifier connected in the said circuit. The closed circuit formed by the inductance $a$ and condenser $b$ constitute the receiving oscillatory circuit no definite aerial being necessary.

Figure 2:
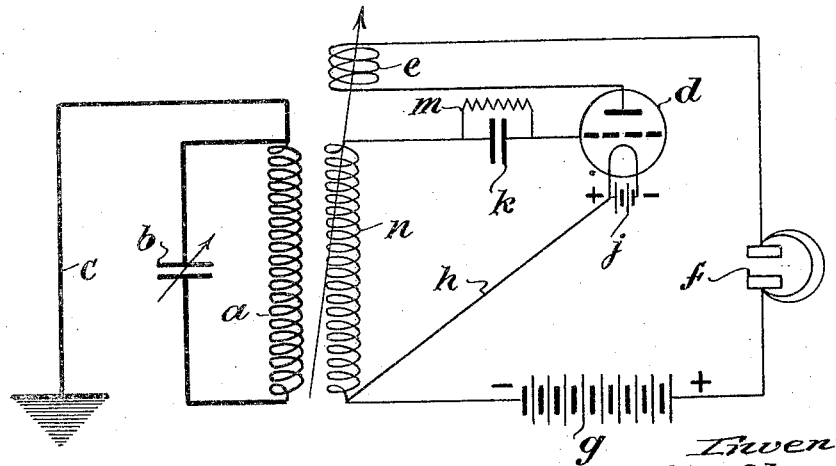
Figure 2 represents a variation in which the grid circuit is loose-coupled to the primary receiving circuit.

Instead of the grid circuit being directly coupled to the primary oscillatory circuit $a$, $b$, it may be loose-coupled thereto, as shown in Figure 2, the inductance $a$ being earthed by the connection $c$ and inductively coupled to a coil $n$ in the grid circuit of the valve $d$, the upper end being connected to the grid condenser $k$ shunted by the grid leak $m$, and the lower end connected to the negative terminal of the anode battery $g$ and also, by the connection $h$, to the positive terminal of the filament battery $j$. The reaction coil $e$ is shown coupled to the coil $n$.

In either of the arrangements shown in Figures 1 and 2 the reaction coil may be omitted, and the anode connected directly to the telephones or amplifier.

Figure 3:
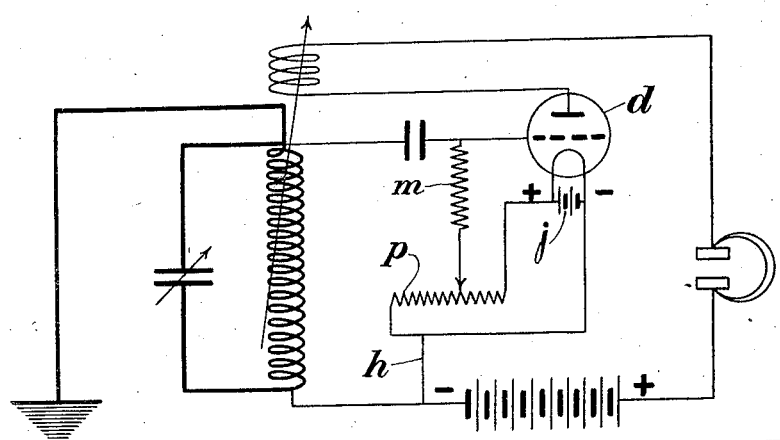
Figure 3 is another diagram showing a slightly modified arrangement in which the positive potential applied to the grid is variable.

The circuit shown in Figure 3 is the same as in Figure 1, except that the grid leak or resistance *m* is connected directly between the grid of the valve *d* and a potentiometer *p* connected across the terminals of the filament battery *j*, whereby the positive potential applied to the grid may be varied. A connection *h* is made between the negative terminal of the anode battery *g* and the potentiometer circuit.

Figure 4:
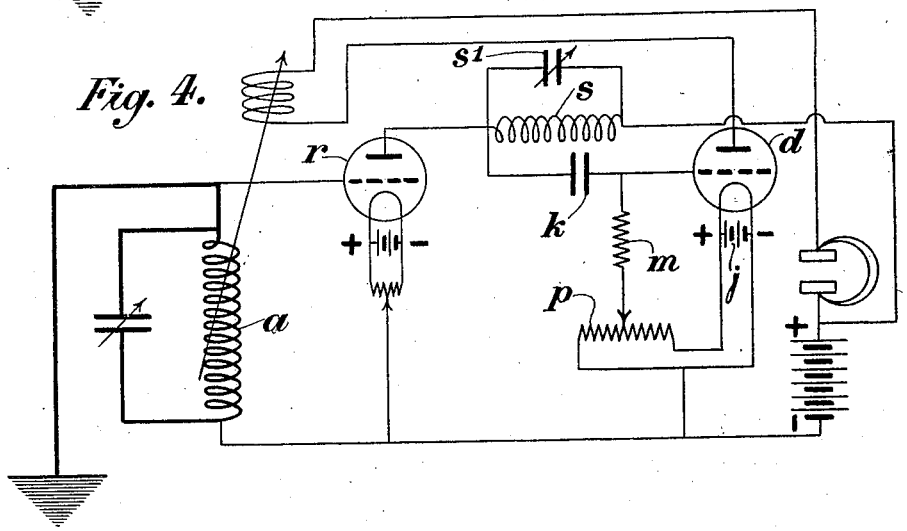
Figure 4 represents the application of the invention to a receiver having radio-frequency amplification.

Any number of stages of radio-frequency or audio-frequency amplification may be used in connection with the circuits above described. For instance, in Figure 4 a radio-frequency amplifying valve *r* is employed, the grid being connected to the upper end of the inductance *a* and a tuned anode circuit *s*, *s¹*, employed as the coupling between the valve *r* and the detector valve *d*, in the known manner. The grid condenser *k* is connected between the anode of valve *r* and the grid of valve *d* and the grid-leak *m* is connected between the grid and the potentiometer *p*, so that a variable positive potential is applied to the grid from the positive terminal of the filament battery *j*. The reaction coil in the anode circuit of valve *d* is coupled to the inductance *a*.

Having fully described my invention, what I desire to claim and secure by Letters Patent is:—

1. Receiving apparatus for wireless signals comprising a thermionic detector valve, a source of electric current for heating the filament of the valve, means for applying to the grid of the valve a normal bias potential which is positive with respect to the negative end of the filament, including a grid input circuit, an external closed oscillatory circuit coupled to the grid input circuit and to the filament, said oscillatory circuit containing a tuning inductance but having no external aerial connected thereto, a grid condenser in the said grid circuit having a capacity between .02 microfarads and .0005 microfarads, a grid leak between the grid and filament having a resistance not exceeding one hundred thousand ohms, and an anode circuit effectively connected to said oscillatory circuit at a point between the tuning inductance and the filament.

2. Receiving apparatus for wireless signals comprising a thermionic detector valve, a source of electric current for heating the filament of the valve, a connection between the grid and the positive end of the filament whereby a positive bias potential relative to the negative end of the filament is applied to the grid, said connection including a grid input circuit, an external closed oscillatory circuit coupled to said grid input circuit and containing a tuning inductance but having no aerial connected thereto, a grid condenser in the said grid input circuit having a capacity between .02 microfarads and .0005 microfarads, a grid leak having a resistance not exceeding one hundred thousand ohms, an anode circuit effectively connected to said oscillatory circuit at a point between the tuning inductance and the filament, and a reaction coil in the anode circuit coupled to the grid input circuit.

3. Receiving apparatus for wireless signals comprising a thermionic detector valve, a source of electric current for heating the filament of the valve, a connection between the grid and the positive end of the filament whereby a positive bias potential relative to the negative end of the filament is applied to the grid, said connection including a grid input circuit, an external closed oscillatory circuit coupled to said grid input circuit and containing a tuning inductance but having no external aerial connected thereto, a connection to earth from said inductance, a grid condenser in the said grid input circuit having a capacity between .02 microfarads and .0005 microfarads, a grid leak having a resistance not exceeding one hundred thousand ohms, and an anode circuit effectively connected to said oscillatory circuit at a point between the tuning inductance and the filament.

4. Receiving apparatus for wireless signals comprising a thermionic detector valve, a source of electric current for heating the filament of the valve, a connection between the grid and the positive end of the filament whereby a positive bias potential relative to the negative end of the filament is applied to the grid, said connection including a grid input circuit, an external closed oscillatory circuit coupled to said grid input circuit and containing a tuning inductance but having no external aerial connected thereto, a connection to earth from said inductance, a grid condenser in the said grid input circuit having a capacity between .02 microfarads and .0005 microfarads, a grid leak having a resistance not exceeding one hundred thousand ohms, an anode circuit effectively connected to said oscillatory circuit at a point between the tuning inductance and the filament, and a reaction coil in the anode circuit coupled to the grid input circuit.

5. Receiving apparatus for wireless signals comprising a thermionic detector valve, a closed oscillatory receiving circuit containing a tuning inductance but having no external aerial connected thereto, a high-frequency amplifier coupling the oscillatory circuit to the grid of the detector valve, a source of electric current for heating the filament of the detector valve, means for applying to the grid of the detector valve a normal bias potential which is positive with respect to the negative end of the filament, a grid condenser connected to the grid of the detector valve having a capacity between .02 microfarads and .0005 microfarads, a grid leak between the grid and filament of the detector valve in parallel with the grid condenser, said grid leak having a resistance not exceeding one hundred thousand ohms, an anode circuit in conjunction with the detector valve, said anode circuit being effectively connected to the oscillatory circuit at a point between the tuning inductance and the filament, and a reaction coil in the anode circuit electro-magnetically coupled to the tuning inductance.

In testimony whereof I have hereunto set my hand.

DEREK SEATON BUTLER SHANNON.